United States Patent
Kang et al.

(10) Patent No.: US 8,424,090 B2
(45) Date of Patent: Apr. 16, 2013

(54) APPARATUS AND METHOD FOR DETECTING OBFUSCATED MALICIOUS WEB PAGE

(75) Inventors: Jung Min Kang, Daejeon (KR); Young Han Choi, Daejeon (KR); Do Hoon Lee, Daejeon (KR); Eung Ki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 545 days.

(21) Appl. No.: 12/410,636

(22) Filed: Mar. 25, 2009

(65) Prior Publication Data

US 2010/0024033 A1   Jan. 28, 2010

(30) Foreign Application Priority Data

Jul. 23, 2008   (KR) ........................ 10-2008-0071762

(51) Int. Cl.
*G06F 11/00* (2006.01)
(52) U.S. Cl.
USPC ............................................ 726/24; 713/188
(58) Field of Classification Search ............. 726/22–24, 726/27, 30; 713/151–152, 154, 187–188
See application file for complete search history.

(56) References Cited

U.S. PATENT DOCUMENTS

| | | | |
|---|---|---|---|
| 6,519,702 B1 * | 2/2003 | Williams | 726/23 |
| 6,643,657 B1 * | 11/2003 | Baird et al. | 1/1 |
| 6,668,369 B1 * | 12/2003 | Krebs et al. | 717/125 |
| 6,671,812 B1 * | 12/2003 | Balasubramaniam et al. | 726/22 |
| 7,349,931 B2 * | 3/2008 | Horne | 1/1 |
| 7,640,583 B1 * | 12/2009 | Marinescu et al. | 726/22 |
| 7,739,740 B1 * | 6/2010 | Nachenberg et al. | 726/25 |
| 7,865,953 B1 * | 1/2011 | Hsieh et al. | 726/22 |
| 7,926,112 B2 * | 4/2011 | Zurko et al. | 726/24 |
| 2004/0172544 A1 * | 9/2004 | Luo et al. | 713/189 |
| 2005/0028002 A1 * | 2/2005 | Christodorescu et al. | 713/200 |
| 2005/0050332 A1 * | 3/2005 | Serret-Avila et al. | 713/176 |

(Continued)

FOREIGN PATENT DOCUMENTS

| KR | 1020040080845 A | 9/2004 |
|---|---|---|
| KR | 10-0789722 B1 | 12/2007 |

OTHER PUBLICATIONS

Royal et al. "Poly Unpack: Automating the Hidden-Code Extraction of Unpack-Executing Malware" [Online], 2006 [Retrieved on: Jan. 22, 2013], IEEE, Proceedings of the 22nd annual computer Secutiry Applications Conference (ACSAC'06), [Retrieved from: http://ieeexplore.ieee.org/stamp/stamp.jsp?tp=&arnumber=4041175 ].*

(Continued)

*Primary Examiner* — April Shan
*Assistant Examiner* — Eric W Shepperd
(74) *Attorney, Agent, or Firm* — Ladas & Parry LLP

(57) ABSTRACT

An apparatus and method for detecting an obfuscated malicious web page are provided to find a malicious web page by deobfuscating an obfuscated malicious code. The apparatus includes an obfuscated code detector that detects whether an obfuscated code is included in a source code of a web page, a deobfuscation function inserter that reconfigures the source code by inserting a function for deobfuscating the obfuscated code into the source code, a deobfuscator that is called by the function inserted into the reconfigured source code and deobfuscates the obfuscated code, and a malicious code detector that detects a malicious code using the deobfuscated code.

14 Claims, 6 Drawing Sheets

U.S. PATENT DOCUMENTS

| | | | |
|---|---|---|---|
| 2006/0036746 A1* | 2/2006 | Davis | 709/228 |
| 2006/0075468 A1* | 4/2006 | Boney et al. | 726/2 |
| 2006/0075500 A1* | 4/2006 | Bertman et al. | 726/24 |
| 2006/0236397 A1* | 10/2006 | Horne | 726/24 |
| 2007/0016948 A1* | 1/2007 | Dubrovsky et al. | 726/22 |
| 2007/0039048 A1* | 2/2007 | Shelest et al. | 726/22 |
| 2007/0136811 A1* | 6/2007 | Gruzman et al. | 726/24 |
| 2007/0208822 A1* | 9/2007 | Wang et al. | 709/217 |
| 2008/0083012 A1* | 4/2008 | Yu et al. | 726/1 |
| 2009/0150999 A1* | 6/2009 | Dewey et al. | 726/24 |
| 2009/0187992 A1* | 7/2009 | Poston | 726/24 |
| 2009/0300764 A1* | 12/2009 | Freeman | 726/24 |
| 2010/0005528 A1* | 1/2010 | Teller et al. | 726/22 |
| 2012/0222117 A1* | 8/2012 | Wong et al. | 726/23 |

OTHER PUBLICATIONS

Yan et al. "Revealing Packed Malware" [Online], 2007 [Retrieved on: Jan. 22, 2013], IEEE, Basic Training, [Retrieved From: http://ieeexplore.ieee.org/stamp/stamp.jsp?tp=&arnumber=4639028 ].*

Yi-Min Wang; et al; "Automated Web Patrol with Strider HoneyMonkeys: Finding Web Sites That Exploit Browser Vulnerabilities", Proceedings of the 13th Annual Network and Distributed System . . . , 2006—research.microsoft.com.

* cited by examiner

FIG. 5

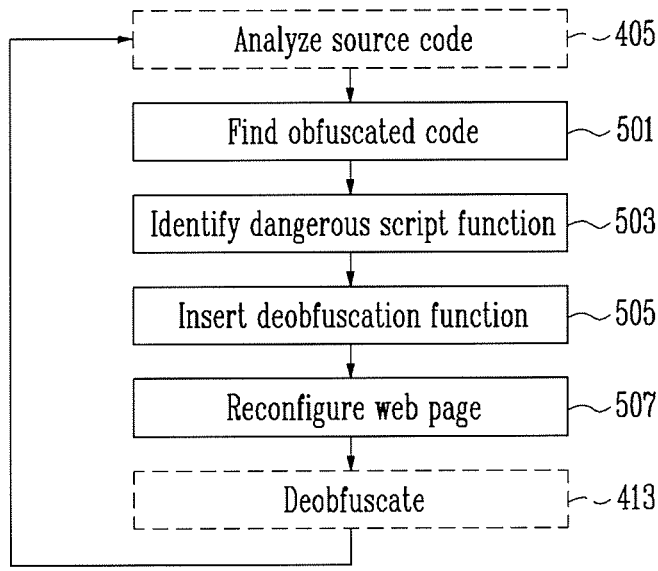

- Analyze source code — 405
- Find obfuscated code — 501
- Identify dangerous script function — 503
- Insert deobfuscation function — 505
- Reconfigure web page — 507
- Deobfuscate — 413

FIG. 6

```
<HTML>
.......
<Script>
Obfuscated code;              ~611
Obfuscated code execution function();  ~613
</Script>
....
</HTML>
```
— 610

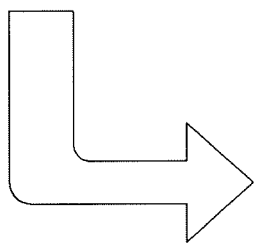

```
<HTML>
.......
<Script>
Obfuscated code;              ~611
Deobfuscation function;       ~621
Obfuscated code execution function();  ~613
</Script>
....
</HTML>
```
— 620

FIG. 7

```
<script>
//Obfuscated character string
t="60,115,99,114,105,112,116,32,116,121,112,101,61,34,116,101,120,116,47,106,115,99,114,105,112,
116,34,62,13,10,102,117,110,99,116,105,11,110,32,105,110,105,116,40,41,32,123,32,13,10,100,111, ..."

//Obfuscation-related dangerous script function
t=eval("String.fromCharCode("+t+")");

alert(t);
document.write(t);
</script>
```

711 — Obfuscated character string block
713 — Obfuscation-related dangerous script function
710 — outer box

720 →

```
//DeObfuscated String Extractor Module
<OBJECT
    classid="clsid:17905A76-2861-440F-A9EE-347DE3AF0090"
    codebase="http://192.168.73.129/attactk/WebFerretAXProj.ocx#version=1.0.0.0"
    width=620
    height=520
    align=center
    hspace=0
    vspace=0
    id="WebFerretAX"
>
</OBJECT>
```

723

```
<script>
t="60,115,99,114,105,112,116,32,116,121,112,101,61,34,116,101,120,116,47,106,115,99,114,105,112,
116,34,62,13,10,102,117,110,99,116,105,11,110,32,105,110,105,116,40,41,32,123,32,13,10,100,111, ..."

//Web page reconfiguration for deobfuscation
var str=
String.fromCharCode(60,115,99,114,105,112,116,32,116,121,112,101,61,34,116,101,120,116,47,106,115,99,114,105,112,
116,34,62,13,10,102,117,110,99,116,105,11,110,32,105,110,105,116,40,41,32,123,32,13,10,100,111, ..."

//DeObfuscated String Extractor Module call
WebFerretAX.CheckString(str);

t=eval("String.fromCharCode("+t+")");
alert(t);
document.write(t);
</script>
```

711, 721, 713 labels

APPARATUS AND METHOD FOR DETECTING OBFUSCATED MALICIOUS WEB PAGE

CROSS-REFERENCE TO RELATED APPLICATION

This application claims priority to and the benefit of Korean Patent Application No. 10-2008-0071762, filed on Jul. 23, 2008, the disclosure of which is incorporated herein by reference in its entirety.

BACKGROUND

1. Field of the Invention

The present invention relates to an apparatus and method for detecting an obfuscated malicious web page, and more particularly, to an apparatus and method for detecting a malicious web page that can detect an obfuscated code in order to detect a malicious code concealed in an obfuscated form within a web page, insert a function for deobfuscating the obfuscated code, and deobfuscate the obfuscated code using the inserted deobfuscation function.

2. Discussion of Related Art

The development of Internet technology has been accompanied by the development of ever more intelligent methods for applying malicious codes to a web page to unlawfully steal or collect important information. Specifically, a problem occurs in a method for installing an unlawful program in a computer accessing a web page by concealing a specific code in a normal web page.

FIG. 1 conceptually illustrates a web attack using a concealed code.

Referring to FIG. 1, an attacker 110 attempting a web attack using a malicious code distributes a malicious program using a malicious program distribution server 130 (step 101). The malicious program distribution server 130 may be configured in a method for installing the malicious program by hacking an existing server, etc.

Then, a malicious code or Java script for linking a user accessing a target server 100 to the distribution sever 130 is inserted by hacking the target server 100 frequently used by a user 140 as an attack target (step 103).

On the other hand, a user 140 who does not know whether the target server 100 has been hacked normally accesses the target server 100 (step 105). Then, the user involuntarily downloads (step 109) a malicious program, etc. by automatically accessing (step 107) the distribution server 130 according to a link code concealed in the target server 100.

Once a malicious code is installed in a computer of the user 140, the attacker 110 manipulates or acquires information of the user 140 using information sent by the malicious code (step 111).

There are many methods for this type of hacking. For example, there is an i-frame method in which a frame is made tiny so as not to alert a user that the target server 100 is being hacked. Also, there is a Java script method in which Java script is used to obfuscate a malicious code inserted into the target server 100, thereby making it difficult for a security manager to detect insertion of the malicious code.

To defend against such attacks, conventional technology uses a method for detecting a malicious code by collecting traffic and events when a user web browser accesses a web site in a virtual environment independent of an execution environment or an environment interworking with the user browser by proxy. Other technology uses a method for detecting a function or method call sequence used to execute a malicious code, checking a value or parameter associated with each composition belonging to the call sequence, and inserting an anomaly monitoring function after or before the call composition.

However, the first method has a problem in that it may not prevent damage to a user computer in advance, and the second method has a problem in that it may not detect an obfuscated malicious code.

Therefore, a method is needed of detecting a malicious code by automatically finding and deobfuscating an obfuscated source code.

SUMMARY OF THE INVENTION

The present invention provides a method and apparatus for detecting an obfuscated malicious web page. The present invention also provides a method and apparatus for finding and deobfuscating an obfuscated code included in a web page and determining whether the deobfuscated code is malicious.

According to an aspect of the present invention, there is provided an apparatus for detecting an obfuscated malicious web page, including: an obfuscated code detector that detects whether an obfuscated code is included in a source code of a web page; a deobfuscation function inserter that reconfigures the source code by inserting a function for deobfuscating the obfuscated code into the source code; a deobfuscator that is called by the function inserted into the reconfigured source code and deobfuscates the obfuscated code; and a malicious code detector that detects a malicious code using the deobfuscated code.

The malicious code detector may detect the malicious code using a rule-based pattern matching method. The apparatus may further include: a malicious code pattern database that provides a malicious code pattern to be used for malicious code detection of the malicious code detector. The apparatus may further include: an obfuscated code rule database that provides a rule of an obfuscated code to the obfuscated code detector. The apparatus may further include: a web browser display controller that displays the detected malicious code on a web browser. The obfuscated code detector may find at least one of a case where an empty character is inserted, a case where a character string concatenation operator "+" is used, a case where a special character is repeatedly used, a case where an alphanumeric code is repeatedly used, and a case where a pointer for a dangerous script function is designated. The apparatus may further include: a web page source extractor that extracts the source code of the web page. The malicious code detector, the obfuscated code detector, and the deobfuscation function inserter may be included in an independent executable file and the deobfuscator is included in a module embedded into the executable file.

According to another aspect of the present invention, there is provided a method for detecting an obfuscated malicious web page, including: determining whether an obfuscated code is included in a source code of a web page; reconfiguring, when the obfuscated code is included, the source code by inserting a function for deobfuscating the obfuscated code into the source code; and deobfuscating the obfuscated code using the reconfigured source code and detecting a malicious code using the deobfuscated code.

The method may further include: detecting the malicious code using the source code before determining whether the obfuscated code is included. The method may further include: displaying that the malicious code has been detected on a web browser when the malicious code has been detected. The function for deobfuscating the obfuscated code may be inserted before a dangerous script function using the obfuscated code. The obfuscated code may be deobfuscated by calling a deobfuscation module in the deobfuscation function before the dangerous script function is executed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 shows details of the step of deobfuscating an obfuscated code according to an exemplary embodiment of the present invention;

FIGS. 6 and 7 show a reconfigured web page source code according to an exemplary embodiment of the present invention.

DETAILED DESCRIPTION OF EXEMPLARY EMBODIMENTS

Hereinafter, an apparatus and method for detecting an obfuscated malicious web page according to exemplary embodiments of the present invention will be described in detail with reference to the accompanying drawings.

Figure 1:
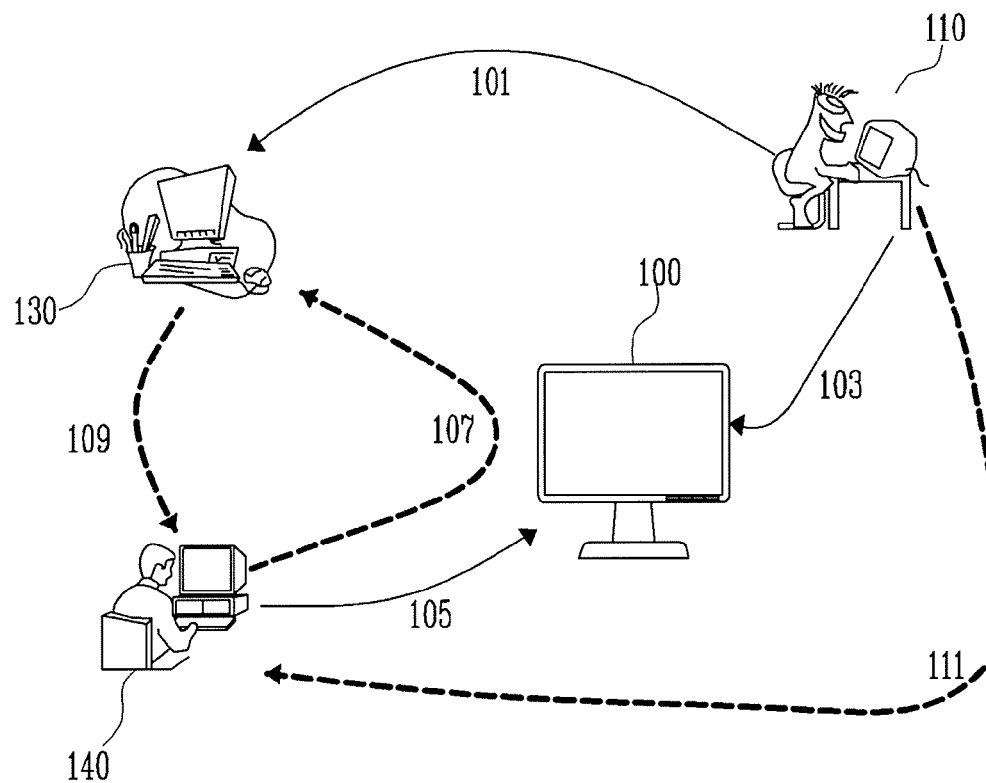
FIG. 1 conceptually illustrates a web attack using a concealed code.
Figure 2:
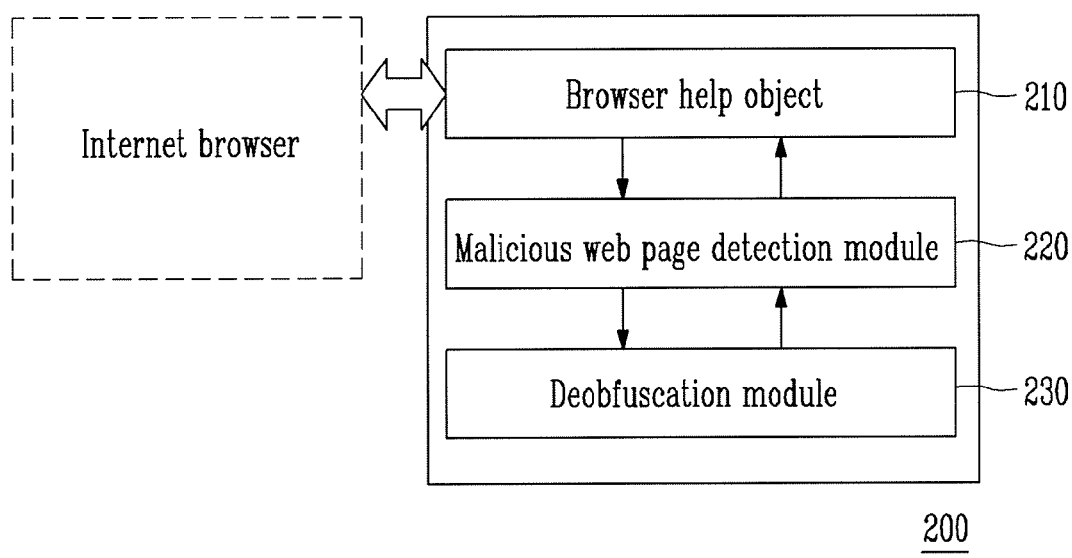
FIG. 2 shows configuration modules of an apparatus for detecting an obfuscated malicious web page according to an exemplary embodiment of the present invention.

FIG. 2 is a block diagram showing a configuration of an apparatus for detecting an obfuscated malicious web page according to an exemplary embodiment of the present invention.

Referring to FIG. 2, an apparatus 200 for detecting an obfuscated web page according to an exemplary embodiment of the present invention includes a browser help object 210, a malicious web page detection module 220, and a deobfuscation module 230.

The apparatus 200 may be configured with a single integration module directly interworking with an Internet browser. Alternatively, in the exemplary embodiment, the Internet browser may be stably executed by separating an execution module.

In an exemplary embodiment of the present invention, the browser help object 210 is connected to an existing Internet browser program in the form of a dynamic linked library (*.dll) file. The malicious web page detection module 220 exists in the form of an independent executable file (*.exe). The deobfuscation module 230 is embedded into the malicious web page detection module 220 in the form of ActiveX.

Here, an applied Internet browser program can be an existing general browser program such as MICROSOFT INTERNET EXPLORER, AMERICA ONLINE NETSCAPE, MOZILLA FIREFOX, or the like.

The malicious web page detection module 220 is a core component responsible for detecting a malicious code by analyzing a source code received from the Internet browser program and inserting a deobfuscation function to call the deobfuscation module for finding and deobfuscating an obfuscated code. Specifically, the apparatus 200 of the present invention uses a rule-based pattern matching method to detect a malicious code. In this case, the apparatus 200 may further include a malicious code pattern database (DB) for storing a malicious code pattern. The apparatus 200 may further include an obfuscation rule DB for storing a rule of an obfuscated code.

The deobfuscation module 230 embedded into the malicious web page detection module 220 can have a file form of OLE Control eXtension (*.ocx) or file extension CAP (*.cap). Wherein OLE corresponds to Object Linking and Embedding and CAP corresponds to a CAPture Document. The deobfuscation module 230 is responsible for receiving a call from an inserted deobfuscation function when the malicious web page detection module 220 is executed and deobfuscating an obfuscated code.

Figure 3:
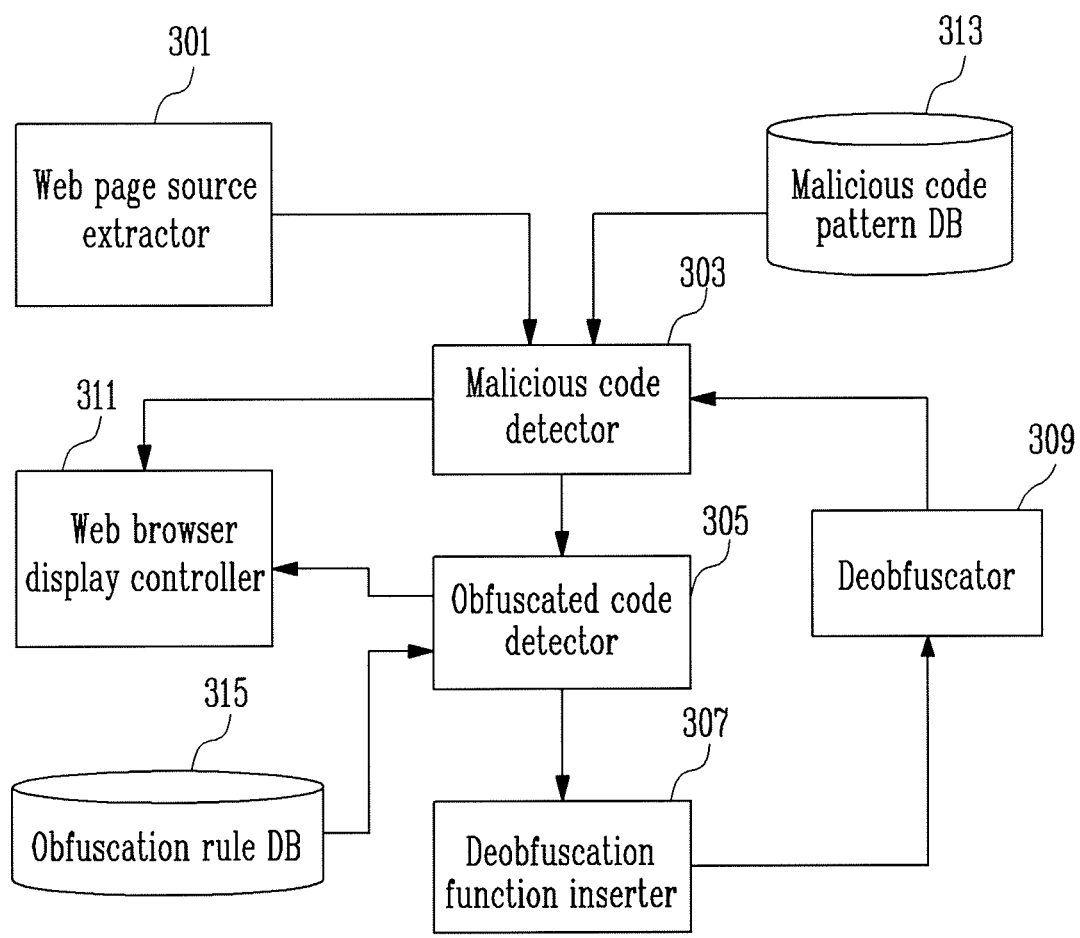
FIG. 3 is a functional block diagram showing the apparatus for detecting an obfuscated malicious web page according to an exemplary embodiment of the present invention.

FIG. 3 is a functional block diagram showing an apparatus for detecting an obfuscated malicious web page according to an exemplary embodiment of the present invention.

Referring to FIG. 3, the apparatus for detecting an obfuscated malicious web page according to an exemplary embodiment of the present invention can include a web page source extractor 301, a malicious code detector 303, an obfuscated code detector 305, a deobfuscation function inserter 307, a deobfuscator 309, a web browser display controller 311, a malicious code pattern DB 313, and an obfuscation rule DB 315.

Here, the web page source extractor 301 and the web browser display controller 311 are included in functions of the browser help object 210 described with reference to FIG. 2. The malicious code detector 303, the obfuscated code detector 305, the deobfuscation function inserter 307, the web browser display controller 311, the malicious code pattern DB 313, and the obfuscation rule DB 315 are included in functions of the malicious web page detection module 220. The deobfuscator 309 is included in a function of the deobfuscation module 230.

The web page source extractor 301 is responsible for extracting a source of a web page from web page information received from a web server. To find an obfuscated code included in the web page, the present invention requires a source code as a program language capable of being visually identified rather than data executed by the web browser.

The malicious code detector 303 is responsible for checking whether a malicious code exists in the extracted web page source code. The malicious code is detected using rule-based pattern matching. When pattern matching is used, the malicious code pattern DB 313 for storing a malicious code pattern is needed.

On the other hand, the malicious code detector 303 can easily detect a malicious code configured in the form of a general script. However, it is difficult to detect a malicious code converted by obfuscation. When an obfuscated code exists, the obfuscated code is deobfuscated using the deobfuscator 309. The malicious code detector 303 redetects whether a malicious code exists in the deobfuscated code.

The obfuscated code detector 305 is responsible for detecting whether an obfuscated code exists in a source code of a web page. When a malicious code or script is generally inserted into a web page, the malicious code is obfuscated and inserted such that a web server manager does not detect the malicious code insertion. Then, it is difficult for the malicious code detector 303 to detect the malicious code due to an undetectable malicious code pattern. Even when the malicious code detector 303 determines whether a malicious code exists, an obfuscated malicious code may remain if an obfuscated code exists.

To find whether an obfuscated code exists in a source code, the obfuscated code detector 305 determines whether an obfuscated code exists using obfuscation rules. The obfuscated code detector 305 determines whether the source code is obfuscated using the obfuscation rules stored in the obfuscation rule DB 315.

In an exemplary embodiment, it is determined that the obfuscated code exists according to the obfuscation rules when an empty character is inserted, a character string concatenation operator "+" is used, a special character "%", "/x", "%u", or the like is repeatedly used, an alphanumeric code is repeatedly used, and a pointer for a dangerous script function is designated.

When the obfuscated code detector 305 determines that the obfuscated code exists in the source code using the above-described rules, the deobfuscation function inserter 307 is responsible for inserting a function capable of deobfuscating the obfuscated code.

Here, the deobfuscation function is inserted before a dangerous script function in which the obfuscated code may be executed.

The reason why the obfuscated code is dangerous is that it is difficult to analyze an operation when the obfuscated code is executed. The obfuscated code itself does not execute any function. To perform a certain function by the obfuscated code, a function for a specific behavior using the obfuscated code is required.

The deobfuscation function inserter 307 is responsible for identifying the obfuscated code before it is executed by inserting a function for deobfuscating an obfuscated code before a function using the obfuscated code.

If the deobfuscation function is inserted before an obfuscated code execution function, the malicious code detector 303 can identify whether the obfuscated code is malicious before the obfuscated code is executed when the deobfuscated code is checked after deobfuscation.

The deobfuscator 309 called by the deobfuscation function inserted by the deobfuscation function inserter 307 deobfuscates the obfuscated code. When the obfuscated code is deobfuscated, it can be identified whether the malicious code exists in the deobfuscated source code by resending the deobfuscated source code to the malicious code detector 303.

When the malicious code detector 303 or the obfuscated code detector 305 detects the malicious code or the obfuscated code, the web browser display controller 311 controls an operation for displaying the detected code on the web browser or stopping the execution of the web browser. If no problem exists, the web browser display controller 311 controls a received web page to be executed.

Figure 4:
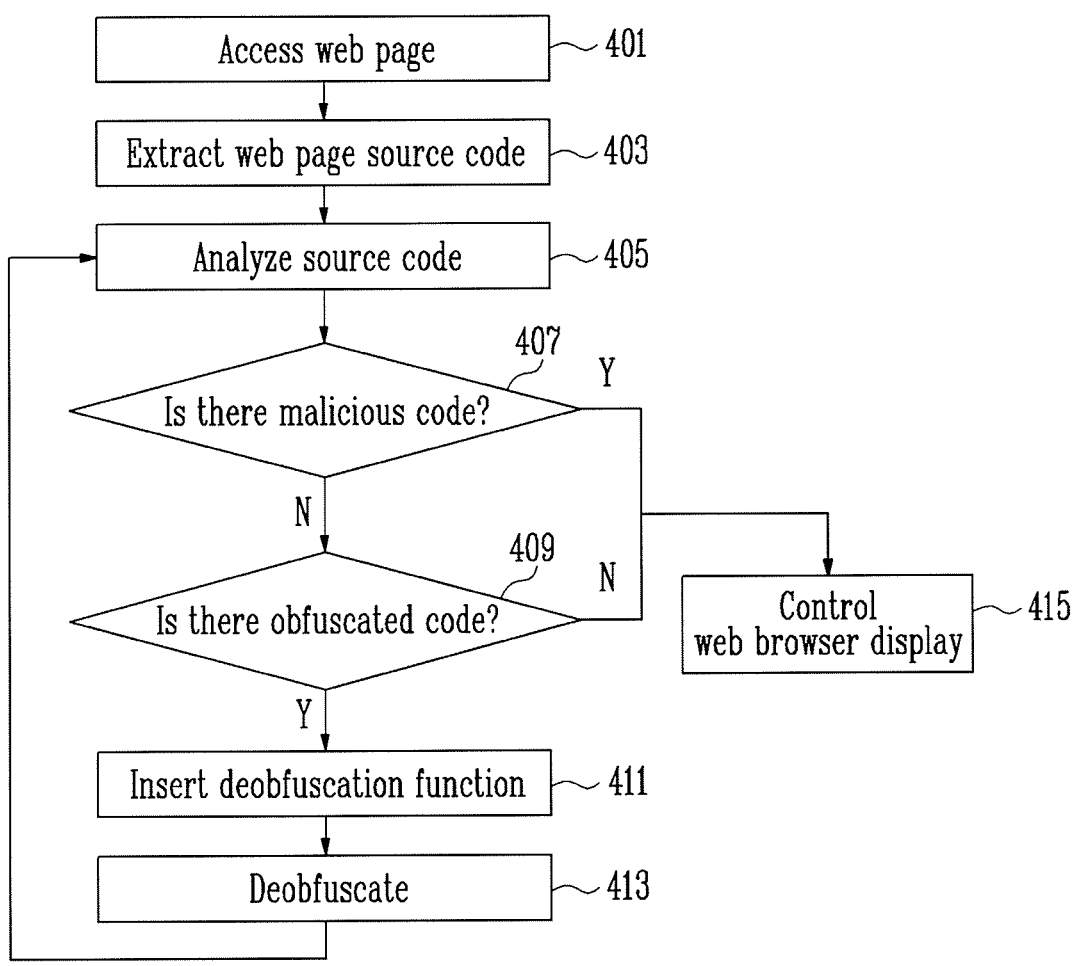
FIG. 4 is a flowchart showing a method of detecting a malicious code in an obfuscated malicious web page according to an exemplary embodiment of the present invention.

FIG. 4 is a flowchart showing a method of detecting a malicious code in an obfuscated malicious web page according to an exemplary embodiment of the present invention.

Referring to FIG. 4, when a personal computer accesses a web server (step 401), web page data is sent from the web server and a source code of a web page is extracted from the sent data (step 403). The extracted source code of the web page is analyzed (step 405). It is detected whether the malicious code is included in the source code (step 407). The malicious code is detected using a rule-based pattern matching method. The malicious code is detected by comparing a malicious code pattern stored in the malicious code pattern DB with a source code pattern of the received web page.

Then, it is detected whether an obfuscated code exists in the source code (step 409). Even when a malicious code is obfuscated and included, it is difficult to find the malicious code using the pattern matching method due to difference from the pattern stored in the malicious code pattern DB. Accordingly, an obfuscated code is detected using the obfuscation rules stored in the obfuscation rule DB and then deobfuscated.

The obfuscation rules can be applied when an empty character is inserted, a character string concatenation operator "+" is used, a special character of "%", "/x", "%u", or the like is repeatedly used, an alphanumeric code is repeatedly used, and a pointer for a dangerous script function is designated.

When the obfuscated code is detected, a deobfuscation function is inserted before a function for executing the obfuscated code (step 411).

The obfuscated code is deobfuscated using the deobfuscation function inserted into the source code (step 413). The deobfuscated source code is analyzed (step 405). It is redetected whether the malicious code exists (step 407).

Upon determining that the malicious code exists, the existence is reported through the web browser display controller. Upon determining that no malicious code exists and no obfuscation exists, the received web page is executed through the web browser display controller (step 415).

FIG. 5 shows details of the step of deobfuscating an obfuscated code according to an exemplary embodiment of the present invention.

Referring to FIG. 5, when the source code is analyzed in step 405 of FIG. 4, an operation for detecting a malicious code and an obfuscated code is performed (step 501). At this time, the obfuscated code can be found using a DB storing rules of obfuscated codes. Upon determining that the obfuscated code is found, a dangerous script function using the obfuscated code is identified (step 503).

The dangerous script function is a script function independently declared and used in the source code. For example, a function of "eval(string);" among Java script functions plays a role in returning a character string as a result value.

Assuming that %$=3 and %&=5 in eval("%$+%&"), the function plays a role in directly returning 8 as a result value despite internal values being defined by character strings.

When this function is used in a character string configured with an obfuscated code, an obfuscated character string is directly executed without deobfuscation. Consequently, a function for receiving and executing or applying an obfuscated code can be a dangerous script function. It is not difficult to find the dangerous script function upon identifying the obfuscated code.

That is, step 409 of determining whether the obfuscated code of FIG. 4 exists includes the step of finding a dangerous script function using the obfuscated code when the obfuscated code exists.

After the dangerous script function is identified and before it is executed, a deobfuscation function is inserted (step 505) and a web page is reconfigured (step 507). That is, step 411 of inserting the deobfuscation function in FIG. 4 includes the step of inserting the deobfuscation function and reconfiguring the existing web page using the inserted function.

Then, the deobfuscation module called from the deobfuscation function inserted into the source code of the reconfigured web page deobfuscates the obfuscated code (step 413).

Since the obfuscated code is executed in a function part, not directly in an obfuscated code part, the obfuscated code is prevented from being executed by inserting the deobfuscation function before the obfuscated code is executed. When the malicious code is identified as in FIG. 4 after the deobfuscation module is called by the inserted deobfuscation function to deobfuscate the obfuscated code, the malicious code search is completed before the dangerous script function is executed.

FIGS. 6 and 7 show a reconfigured web page source code according to an exemplary embodiment of the present invention.

FIG. 6 shows a conceptual example of a reconfigured web page source code and FIG. 7 shows an actual example thereof.

In FIG. 6, a screen 610 conceptually shows a source code of a web page received from a web server. As indicated by reference numerals 611 and 613, the web page includes both an obfuscated code 611 and an obfuscated code execution function 613.

When the web page is reconfigured according to an exemplary embodiment of the present invention, a deobfuscation function 621 is inserted between the obfuscated code 611 and the obfuscated code execution function 613 as indicated by reference numeral 620. Then, the obfuscated code is deobfuscated before execution.

FIG. 7 shows an actually applied exemplary embodiment. Reference numeral 710 denotes a source code before reconfiguration. Here, reference numeral 711 denotes an actual example of the obfuscated code and reference numeral 713 denotes a dangerous script function for executing the obfuscated code.

Reference numeral 720 denotes a reconfigured code, reference numeral 721 denotes a deobfuscation function, and reference numeral 723 denotes a part in which the deobfuscation function is defined.

When the source code is reconfigured in this method, the deobfuscation module called from the function 721 deobfuscates the obfuscated code 711.

Figure 8:
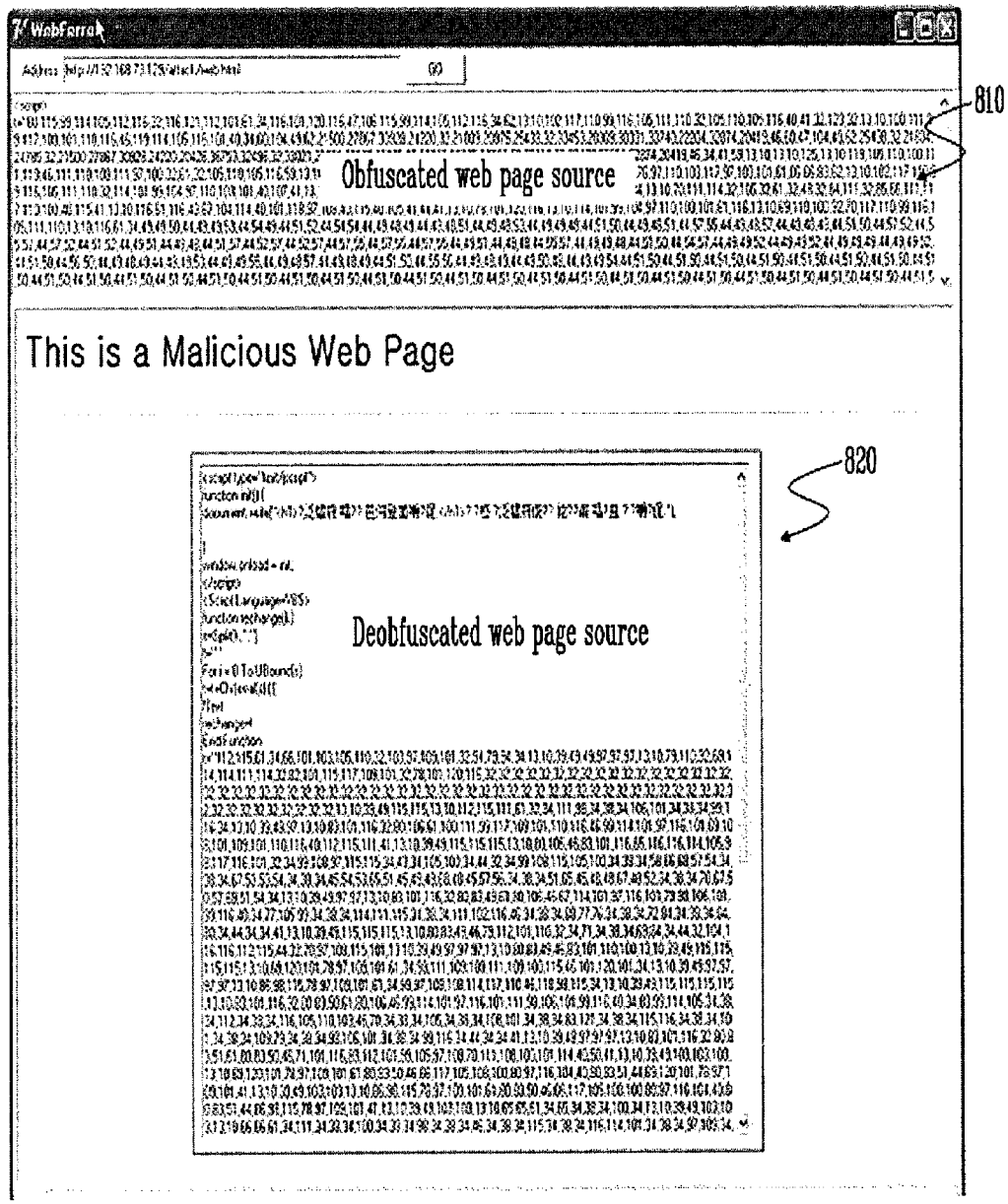
FIG. 8 shows an example of a source code deobfuscated in accordance with the present invention.

FIG. 8 shows an exemplary embodiment when the present invention is executed.

FIG. 8 shows an example of a source code deobfuscated in accordance with the present invention. A screen 810 displays a source code of a web page. From FIG. 8, it can be seen that a script is obfuscated in a numeric string. A lower screen 820 displays a deobfuscated source code. It can be seen that another obfuscation exists in the deobfuscated source code. In this example, it can be seen that the source code of the web page is doubly obfuscated.

When an apparatus and method for detecting an obfuscated malicious web page proposed in the present invention is used, any malicious code inserted into a web page in an obfuscated form can be found before the malicious code is executed. The present invention can more quickly and efficiently detect the malicious code than a conventional method.

While the present invention has been shown and described in connection with exemplary embodiments thereof, it will be apparent to those skilled in the art that modifications and variations can be made without departing from the spirit and scope of the invention as defined by the appended claims.

What is claimed is:

1. A method of detecting malicious code in a web page, the method comprising:
   extracting native source code from web page information;
   searching the native source code for malicious code by attempting to match known malicious code patterns within the native source code;
   detecting malicious code in the native source code when at least one of the known malicious code patterns matches within the native source code;
   displaying a message that malicious code has been detected on a web browser when malicious code has been detected in the native source code;
   searching for obfuscated code in the native source code, wherein the obfuscated code is selected from a group consisting of an empty character obfuscated code, a character string concatenation operation obfuscated code, a special character obfuscated code, a repeatedly used alphanumeric obfuscated code, and a pointer obfuscated code for a dangerous script function;
   inserting a deobfuscation function in the native source code in front of the obfuscated code when the obfuscated code is found in the native source code;
   using the deobfuscation function to deobfuscate the obfuscated code into unobfuscated code to make a deobfuscated source code from the native source code with the found obfuscated code;
   searching the deobfuscated source code for malicious code by attempting to match known malicious code patterns within the deobfuscated source code;
   detecting malicious code in the deobfuscated source code when at least one of the known malicious code patterns matches within the deobfuscated source code; and
   displaying the message that malicious code has been detected on the web browser when malicious code has been detected in the deobfuscated source code.

2. The method of claim 1, further comprising receiving the web page information from a web server.

3. The method of claim 1, wherein the known malicious code patterns are stored in a database (DB).

4. The method of claim 1, wherein the detecting steps use rule-based pattern matching.

5. The method of claim 1, wherein the character string concatenation operation obfuscated code includes a "+".

6. The method of claim 1, wherein the special character obfuscated code is selected from a group consisting of "%", "/x", and "%u".

7. The method of claim 1, wherein the dangerous script function is a script function independently declared and used in the source code.

8. A non-transitory computer readable recording media having written thereon coded instructions for detecting malicious code in a web page, the non-transitory computer readable recording media comprising:
   coded instructions for extracting native source code from web page information;
   coded instructions for searching the native source code for malicious code by attempting to match known malicious code patterns within the native source code;
   coded instructions for detecting malicious code in the native source code when at least one of the known malicious code patterns matches within the native source code;
   coded instructions for displaying a message that malicious code has been detected on a web browser when malicious code has been detected in the native source code;
   coded instructions for searching for obfuscated code in the native source code, wherein the obfuscated code is selected from a group consisting of an empty character obfuscated code, a character string concatenation operation obfuscated code, a special character obfuscated code, a repeatedly used alphanumeric obfuscated code, and a pointer obfuscated code for a dangerous script function;
   coded instructions for inserting a deobfuscation function in the native source code in front of the obfuscated code when the obfuscated code is found in the native source code;
   coded instructions for using the deobfuscation function to deobfuscate the obfuscated code into unobfuscated code to make a deobfuscated source code from the native source code with the found obfuscated code;

coded instructions for searching the deobfuscated source code for malicious code by attempting to match known malicious code patterns within the deobfuscated source code;

coded instructions for detecting malicious code in the deobfuscated source code when at least one of the known malicious code patterns matches within the deobfuscated source code; and coded instructions for displaying the message that malicious code has been detected on the web browser when the malicious code has been detected in the deobfuscated source code.

9. The non-transitory computer readable recording media of claim 8, further comprising coded instructions for receiving the web page information from a web server.

10. The non-transitory computer readable recording media of claim 8, wherein the known malicious code patterns are stored in a database (DB).

11. The non-transitory computer readable recording media of claim 8, wherein the detecting steps use rule-based pattern matching.

12. The non-transitory computer readable recording media of claim 8, wherein the character string concatenation operation obfuscated code includes a "+".

13. The non-transitory computer readable recording media of claim 8, wherein the special character obfuscated code is selected from a group consisting of "%", "/x", and "%u".

14. The non-transitory computer readable recording media of claim 8, wherein the dangerous script function is a script function independently declared and used in the source code.

* * * * *